United States Patent
Hoiness

(10) Patent No.: US 7,362,236 B2
(45) Date of Patent: Apr. 22, 2008

(54) MOBILE UTILITY DATA COLLECTION SYSTEM WITH VOICE TECHNOLOGY, SUCH AS FOR DATA COLLECTION RELATING TO AN ELECTRIC, GAS, OR WATER UTILITY

(75) Inventor: Steve Hoiness, Spokane, WA (US)

(73) Assignee: Itron, Inc., Liberty Lake, WA (US)

( * ) Notice: Subject to any disclaimer, the term of this patent is extended or adjusted under 35 U.S.C. 154(b) by 335 days.

(21) Appl. No.: 11/294,748

(22) Filed: Dec. 6, 2005

(65) Prior Publication Data

US 2006/0119488 A1 Jun. 8, 2006

Related U.S. Application Data

(60) Provisional application No. 60/633,426, filed on Dec. 6, 2004.

(51) Int. Cl.
*G08B 23/00* (2006.01)
*G08C 15/06* (2006.01)

(52) U.S. Cl. .............. 340/870.02; 455/79; 704/231
(58) Field of Classification Search ........... 340/870.02, 340/870.07; 455/79, 563, 575.9; 704/231
See application file for complete search history.

(56) References Cited

U.S. PATENT DOCUMENTS

2004/0093209 A1* 5/2004 Okutani ............... 704/231
2005/0023347 A1* 2/2005 Wetzel et al. ............ 235/385

OTHER PUBLICATIONS

"Magellan RoadMate 700 (North America)," Thales Navigation, Inc., 2004 http://www.magellangps.com/en/products/product.asp?PRODID=955, 3 pages, Internet accessed on Oct. 27, 2004.

* cited by examiner

*Primary Examiner*—Timothy Edwards, Jr.
(74) *Attorney, Agent, or Firm*—Perkins Coie LLP

(57) ABSTRACT

A mobile data collection system with voice capabilities is provided. The mobile data collection system can be a system for automatically or semi-automatically collecting data regarding consumption of a public utility, but can also be a system for collecting other types of data. The system may include a speech synthesis component configured to provide audio output to an operator, the output including audible signals corresponding to prerecorded human speech or artificial human speech. For example, the prerecorded human speech or artificial human speech may include statements for informing an operator about collection of utility data or about a current state of the mobile utility data collection system. The system may also include a voice recognition component configured to process incoming human speech commands. For example, the voice recognition component may be configured for use in generating computer-readable instructions for controlling at least some operations of the system.

27 Claims, 8 Drawing Sheets

| SAMPLE VOICE COMMAND | SAMPLE ACTION |
|---|---|
| "ID missed meters" | Identifies missed meters in route |
| "Where am I" | Specifies location coordinates of vehicle. |
| "Help" | Guides user through menus of help options. |
| "Next route" | Loads next route on route list. |
| "Repeat last instruction" | Repeats the most recently recited. |
| "Load new route" | Loads a currently selected route. |
| "Select route" | Guides user through verbal process of selecting new route. |
| "List menu items" | Specifies current menu options. |
| "Last endpoint" | Specifies most recently read endpoint. |
| "Input new location" | Guides user through verbal process of inputting new location information for an endpoint" |
| "Input note" | Guides user through verbal process of inputting a note in a route" |
| "Update meter data" | Guides user through verbal process of updating meter data for a current endpoint in the route. |
| "Filter endpoints" | Guides user through verbal process of filtering out specific endpoints in the route" |
| "Input route history" | Guides user through verbal process of inputting route history information. |
| "Input manual read" | Guides user through verbal process of inputting manual read information for an endpoint in the current route. |
| "Logon" | Guides user through verbal process of logging on to the system. |

*FIG. 4*

| DATA TYPE | SAMPLE SPEECH |
|---|---|
| Driving Directions | • "Turn right on Main Street in 200ft"<br>• "Exit left to Bourbon Street in 500ft" |
| Route Optimization Instructions | • "Pull into alley to read meter ID# 7441"<br>• "Slow down: entering dense meter area" |
| General Alerts | • "Mean dog at 12205 S.E. 67th Place"<br>• "Watch for large pothole on Oak Lane" |
| Route Discrepancies | • "The system is unable to read meter ID# 3342"<br>• "Missed meters in route; proceed back to 5th and Maple"<br>• "An out of route endpoint has been identified on this route"<br>• "Tamper detected at 300 Miller Avenue" |
| Service Requests | • "Service request at 1444 West Billings"<br>• "Meter ID# 22 located at 1315 Trent Street requires service; approaching in 500 ft" |
| Route Status | • "Route 17B is now complete"<br>• "Route 17B is complete except for missed endpoint ID# 8812 and missed endpoint ID#8015" |

*FIG. 5*

MOBILE UTILITY DATA COLLECTION SYSTEM WITH VOICE TECHNOLOGY, SUCH AS FOR DATA COLLECTION RELATING TO AN ELECTRIC, GAS, OR WATER UTILITY

CROSS-REFERENCE TO RELATED APPLICATION

This application claims priority to U.S. Provisional Patent Application No. 60/633,426, filed Dec. 6 2004, entitled "Mobile Utility Data Collection System with Voice and Speech Technology, such as for Data Collection Relating to an Electric, Gas, or Water Utility," which is incorporated by reference.

BACKGROUND

Utility companies typically rely on meter reading technology to determine their customer's rates of utility consumption. In some utility meter reading applications, operators drive vehicles having radio-equipped data collection units around an area to read electric, gas, and/or water meters. The meters are equipped with modules that allow them to send and receive signals. This style of meter reading, sometimes referred to as mobile automatic meter reading (MAMR), allows meter reading to be completed without direct access to the meter.

MAMR is sometimes used in saturated areas where there may be large populations of meters, difficult-to-access meters, or hazardous-to-read meters. When used in such areas, MAMR can dramatically improve meter reading efficiency. For example, a single data command unit transceiver reads an average of 10,000-12,000 meters in an eight-hour shift, and can read up to 24,000 meters per day, depending on meter density and system use.

Routes for MAMR are typically defined geographically and may include hundreds or thousands of meters. The meters on the route are read using one or more techniques. For example, with a wake-up technique, an operator navigates a MAMR-equipped vehicle through an area. The MAMR equipment on the vehicle sends wakeup signals to notify the meters in the area to send meter reading data. With a bubble-up technique, the MAMR equipment on the vehicle simply picks up broadcasted signals from all meters in its vicinity.

To determine the location of meters in a route, MAMR systems typically rely on route information provided by the utility. In some cases, the route information includes a list that identifies each meter using a unique ID assigned to the meter and address information relating to the meter's location (e.g., street/building address). The route information is typically formulated in advance of driving the route, and is often based on the geographic location of each meter relative to other meters in the route. For example, a MAMR route may have starting and ending points, and meters are read according to proximity from a vehicle moving between the starting and ending points.

The route information may be displayed to the operator of the MAMR vehicle in one or more forms (e.g., map, directions, address list, etc.), so that the operator knows where to navigate the MAMR vehicle to best perform the route. Typically, the operator of the MAMR vehicle pulls over to the side of the road to view the route information and/or otherwise interact with the MAMR system, such as when providing input to the MAMR system or requesting information. Among other problems, this is time consuming and/or may result in error-prone information exchanges between the operator and the MAMR system.

BRIEF DESCRIPTION OF THE DRAWINGS

FIG. 4 is a block diagram showing an example of a data structure for voice recognition features of the mobile data collection system of FIGS. 1 and 2.

FIG. 5 is a block diagram showing an example of a data structure for speech synthesis features of the mobile data collection system of FIGS. 1 and 2.

Figure 1:
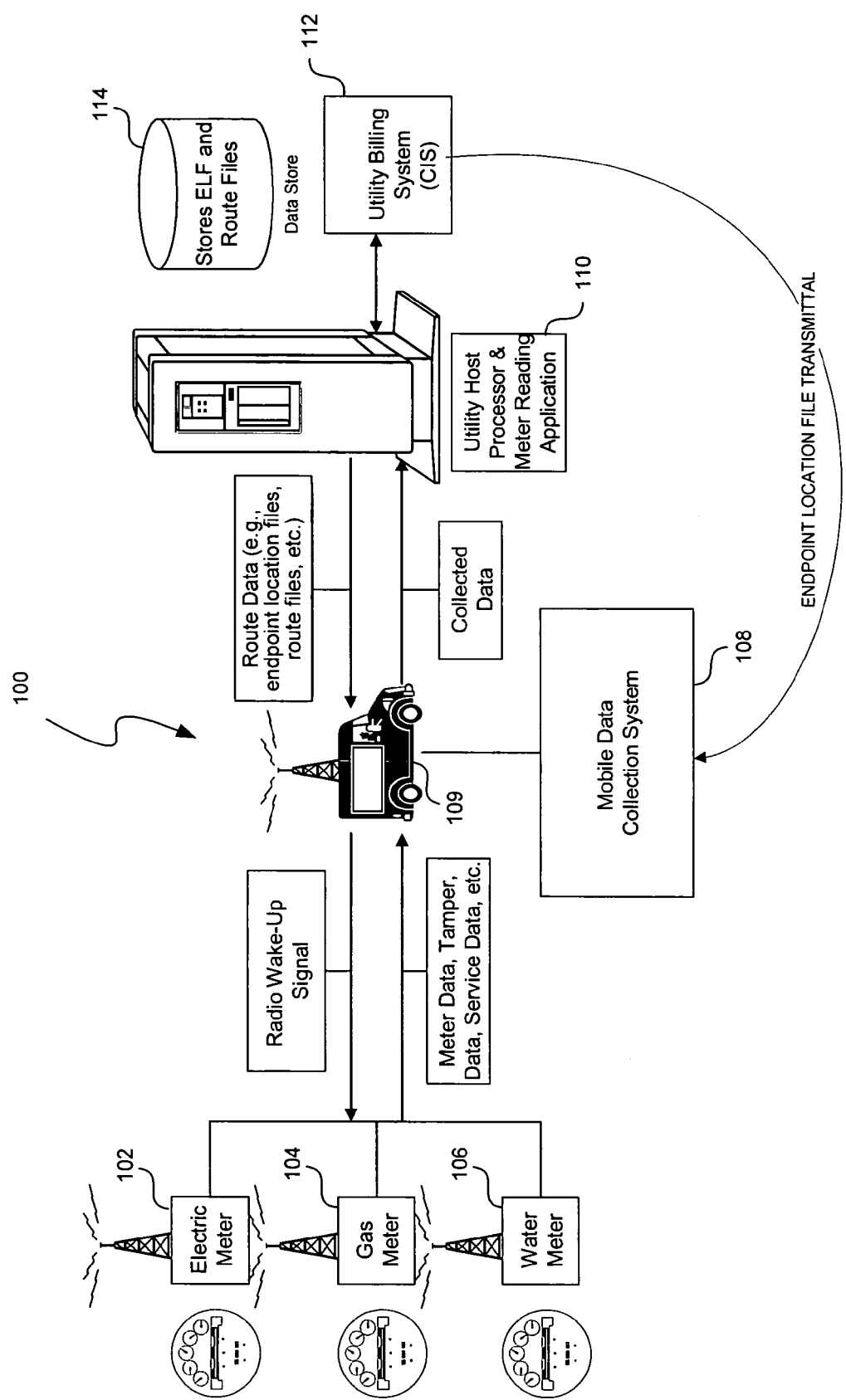
FIG. 1 is a block diagram showing an example of a system for performing mobile collection of meter reading data, under one embodiment.

The headings provided herein are for convenience only and do not necessarily affect the scope or meaning of the claimed invention. In the drawings, the same reference numbers identify identical or substantially similar elements or acts. To facilitate the discussion of any particular element or act, the most significant digit or digits in a reference number refer to the figure number in which that element is first introduced (e.g., element 204 is first introduced and discussed with respect to FIG. 2).

A portion of this disclosure contains material to which a claim for copyright is made. The copyright owner has no objection to the facsimile reproduction by anyone of the patent document or patent disclosure (including Figures), as it appears in the Patent and Trademark Office patent file or records, but reserves all other copyright rights whatsoever.

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

It is intended that the terminology used in the description presented be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

I. Overview

The method and system described herein provide a mobile data collection system with speech and/or voice recognition capabilities. In some embodiments, the method and system provide an efficient, effective, and accurate way for an operator to exchange information, and otherwise interact, with the mobile data collection system so that, in one example, meter reading, meter servicing, and other utility related services may take place. The method and system may also pertain to other types of data collection.

Functions of the mobile data collection system with speech and/or voice recognition capabilities may include text-to-speech or other speech synthesis capabilities that translate computer-readable instructions to computer-generated speech. In some embodiments, speech synthesis capabilities are used to direct navigation during a meter reading or meter servicing route. For example, the speech synthesis capabilities may indicate where an operator needs to go next on the route (e.g., "Turn right on Washington Street") or where to find a meter on a route (e.g., "Pull into alley to read meter ID# 7441"). Likewise, speech synthesis capabilities may be used to reflect the status of operations handled by the mobile data collection system (e.g., "The system is unable to read meter ID# 3342"). Another example of using speech synthesis capabilities include alerting the operator to impending activities or notifying the operator of a route's history or notes (e.g., "Beware of mean dog at 12205 S.E. $67^{th}$ Place" or "Watch for large pothole on Oak Lane"). The speech synthesis capabilities may also provide an indication of a completed route (e.g., "Route 17B is now complete"). In some embodiments, the speech synthesis capabilities provide speech flags that alert the operator to events such as a missed endpoint (e.g., "Route 17B is complete except for missed endpoint ID# 8812 and missed endpoint ID# 8015"), an out-of-route endpoint (e.g., "An out of route endpoint has been identified"), a service request (e.g., "Endpoint service request at 876 $12^{th}$ Street NE"), a tamper request (e.g., "Tamper alert: please check endpoint ID # 2222"), etc.

To help the operator more effectively and efficiently navigate the vehicle through the route, speech synthesis capabilities may be used to let a operator know when and how much to slow down in a certain area so that reads can be conducted more effectively (e.g., "Slow down: entering dense meter area"). Another use of speech synthesis capabilities includes directing a field service worker to check a meter at a specific location (e.g., "Meter ID# 22 located at 1315 Trent Street requires service; approaching in 500 ft"). In general, the speech synthesis capabilities allow the operator to continue safely on the route without having to pull over.

In some embodiments, the mobile data collection system also includes voice recognition capabilities that allow the driver of the vehicle or another operator to speak commands rather than type or input them using a key pad, joystick, mouse, etc. In general, any I/O functionality can be implemented, at least in part, using such techniques. Examples of voice recognition capabilities of the mobile data collection system include using voice recognition for automated button clicks or menu access (e.g., commands to move on to next route, update meter data, update address information, add a note, etc.).

The mobile data collection system's voice recognition capabilities can also be used for reducing or automating complex steps that otherwise involve multi-button efforts (e.g., filtering out specific endpoints from a route information file, adding a note about a portion of a route, inputting route history information, etc.). For example, the operator can use the voice recognition capabilities to enter manual meter read information such as the consumption displayed by a meter when automatic meter reading is not possible. Likewise, the operator can use voice recognition capabilities to select a next route that the operator wants to travel. For example, if the operator has completed a first route and wants to move on to proceed with a second route, the operator can use a command that indicates the selected route. The voice recognition functionality may also provide user assistance. For example, the mobile data collection system can present the operator with a menu of help options in response to the question "Where am I?" or "I need help!" In another example, the mobile data collection system is configured so that the operator can log on to the system using voice commands.

In some embodiments, the voice recognition capabilities are implemented using a headset to avoid background noise. In addition, a filtering system may be employed to eliminate non-commands and other background noise such as phone conversations, radios, etc.

II. Representative System

FIG. 1 and the following discussion provide a brief, general description of a suitable environment in which the invention can be implemented. Although not required, aspects of the invention are described in the general context of computer-executable instructions, such as routines executed by a general-purpose computer (e.g., a server computer, wireless device, or personal/laptop computer). Those skilled in the relevant art will appreciate that the invention can be practiced with other communications, data processing, or computer system configurations, including Internet appliances, hand-held devices (including personal digital assistants (PDAs)), wearable computers, all manner of cellular or mobile phones, embedded computers (including those coupled to vehicles), multi-processor systems, microprocessor-based or programmable consumer electronics, set-top boxes, network PCs, mini-computers, mainframe computers, and the like. Indeed, the terms "computer," "host," and "host computer" are generally used interchangeably and refer to any of the above devices and systems, as well as any data processor.

Aspects of the invention can be embodied in a special purpose computer or data processor that is specifically programmed, configured, or constructed to perform one or more of the computer-executable instructions explained in detail herein. Aspects of the invention can also be practiced in distributed computing environments where tasks or modules are performed by remote processing devices, which are linked through a communication network. In a distributed computing environment, program modules may be located in both local and remote memory storage devices.

Aspects of the invention are stored or distributed on computer-readable media, including magnetically or optically readable computer disks, as microcode on semiconductor memory, nanotechnology memory, organic or optical memory, or other portable data storage media. Indeed, computer-implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or may be provided on any analog or digital network (packet switched, circuit switched, or other scheme). Those skilled in the relevant art will recognize that portions of the invention reside on a server computer, while corresponding portions reside on a client computer, such as a mobile device.

Referring to FIG. 1, a mobile automatic meter reading (MAMR) system 100 on which the speech and/or voice recognition capabilities are implemented provides various networked components. The system 100 is an example of one arrangement of elements, but others are possible. The system 100 includes a collection of utility meters (102, 104, and 106). The utility meters may be of the same or different types (e.g., electric 102, gas 104, water 106, or other (not shown)). The utility meters (102, 104, and 106) may be distributed in a bounded or unbounded geographical area. Each utility meter (102, 104, or 106) is connected to or associated with a utility consuming facility (not shown). For example, a utility meter may correspond with a household, a commercial facility, or another utility consuming facility or device.

While not illustrated in detail, each meter (102, 104, or 106) includes a storage component (not shown) for storing collected data before transmission to a data collection system. The storage component may also store information identifying the meter, such as a meter identification number. In addition, each meter may be configured with a receiver/transmitter telemetry device (e.g., an encoder receiver transmitter (ERT)) capable of sending and receiving signals to and from a mobile data collection system 108. In general, these components (meter, storage, and telemetry device) may be collectively referred to as an "endpoint." However, the term "endpoint" may herein refer to any one of a number of possible configurations for locally collecting data, such as utility consumption data, and not only the sample configuration described above.

In some embodiments, the mobile data collection system 108 sends a wake-up signal to an endpoint. The received wake-up signal prompts the endpoint to transmit meter reading data to the mobile data collection system 108. In alternative embodiments, "bubble-up" (broadcast) techniques are used instead of the "wake-up" technique described above. In yet other embodiments, the mobile data collection system 108 is capable of point-to-point communications with specific endpoints.

To facilitate MAMR or similar techniques, the mobile data collection system 108 is installed in a vehicle 109 or is otherwise configured to be transported through a route (e.g., configured as a portable hand held). The vehicle or system includes the appropriate antennas, power supply, any necessary mounts, etc.

The system 100 also includes a host processing system and/or meter reading application(s) 110 for processing collected meter reading data. In some embodiments, the host processing system and/or meter reading application(s) 110 use customer information to create route files used when driving the route to collect meter data. Examples of meter reading applications include MV-RS™, Premierplus4™, Viena™, and Integrator™, all by Itron, Inc. of Spokane, Wash. The host processing system and/or meter reading application(s) 110 may operate in association with systems operated by a utility company, such as a utility billing system 112 or, more generally, a customer information system (CIS). In this way, the host processing system and/or meter reading application(s) 110 can also communicate data to the mobile data collection system 108. This information may include both route file and endpoint location file (ELF) data, which is stored in a data store 114 prior to export from the billing system/CIS. However, in some embodiments, endpoint location files are transmitted directly from the billing system/CIS 112 to the mobile data collection system 108. Likewise, data collected by the mobile data collection system 108 may be returned to host processing system and/or the meter reading application(s) 110 for processing.

Figure 2:
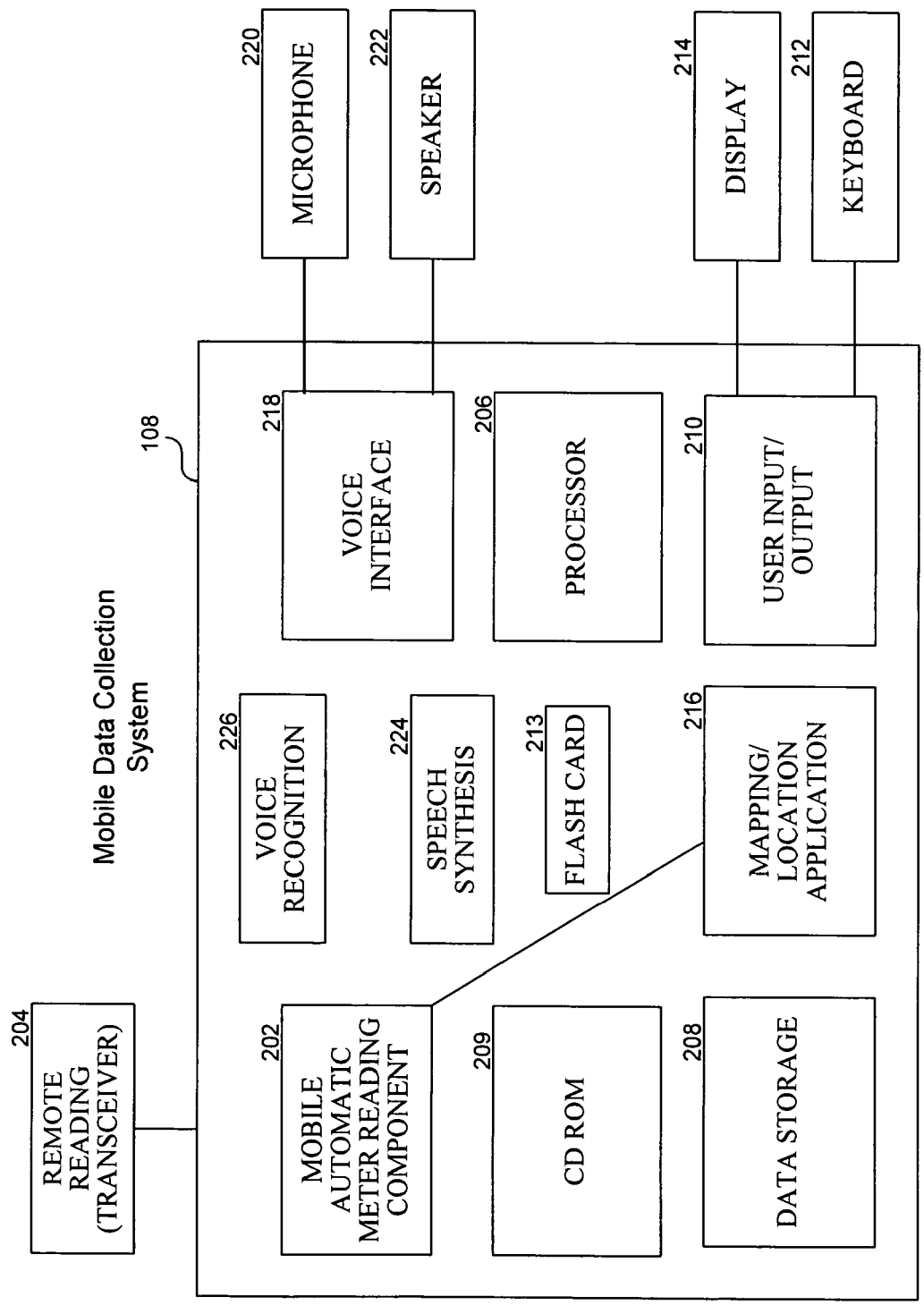
FIG. 2 is a block diagram showing an example implementation of the mobile data collection system of FIG. 1, which includes voice recognition and speech technology.

Referring to FIG. 2, the mobile data collection system 108 of FIG. 1 is shown in more detail. A mobile automatic meter reading component 202 includes applications to maintain route-related meter reading statistics, provide operating status information, and store, process, format, and display collected data. The mobile automatic meter reading component 202 may also include administrative functionality that administrative users can use to control preferences and settings of the mobile data collection system 108. In addition, the mobile automatic meter reading component 202 may include functionality to access and manipulate endpoint location files. When coupled to a radio based remote reading component 204 (which may include a transceiver), the mobile automatic meter reading component 202 can facilitate communication with remote endpoints. For example, the radio based remote reading component 204 may send, via a radio antenna, signals to wake-up meters that function in "wake-up" mode and to receive and manage incoming data.

A processor 206 and memory or other data storage 208 provide capabilities to control several processes, including management of collected meter reading data and processing of input for purposes of determining an efficient route for meter reading. For example, the data storage 208 can store not only collected meter data, but also route information and other information. A CD ROM 209 may handle removable media in the mobile data collection system 108. In some embodiments, route data is transferred to and from the mobile data collection system 108 using a removable flash module 213. For example, an operating system (not shown) associated with the mobile data collection system 108 may recognize the flash module 213 as a removable drive, allowing standard file access. In other embodiments, the route information is transferred to the mobile data collection system via a local area network (LAN), a wide area network (WAN), etc. Periodic data backups to the flash module can be configured in the mobile automatic meter reading component 202.

A user input/output component 210 provides an appropriate user interface for an operator of the data collection system 108, along with a keyboard 212 and a display screen 214. Other user input/output options may be used including touch screens, mouses, joysticks, keyboards, LCD screens, etc. For example, the mobile data collection system 108 may provide a color touch screen display for ease of use and clear graphical mapping displays.

One application of the input/output component 210 includes displaying and controlling mapping images generated by a mapping component 216. In this way, the operator is provided with feedback, so that he or she can determine which meter readings have been completed on a particular route, and so he or she can view meters on the route in relation to the vehicle and to other meters. The mapping component 216 (e.g., Microsoft MapPoint) interfaces with the mobile automatic meter reading component 202. In some embodiments, the mapping component includes or is associated with Global Positioning System (GPS) functionality, Global Information Services (GIS) functionality, or other functionality that facilitates location determination (e.g., via cellular telephone network). For example, operators of the mobile data collection system 108 may use the mapping component 216 to produce latitude and longitude coordinates used in locating endpoints in the field and to tracking the progress of the mobile data collection vehicle while driving the route.

To facilitate speech and/or voice recognition capabilities the mobile data collection system may include a voice interface 218, coupled to a microphone 220 and a speaker 222. The voice interface 218 includes or is associated with a speech synthesizer 224 component and/or a voice recognition component 226.

Any one of the components described above may be contained on a notebook computer or other device that can be easily removed from the vehicle when not in use, such as the Itronix™ GoBook MAX™.

Figure 3:
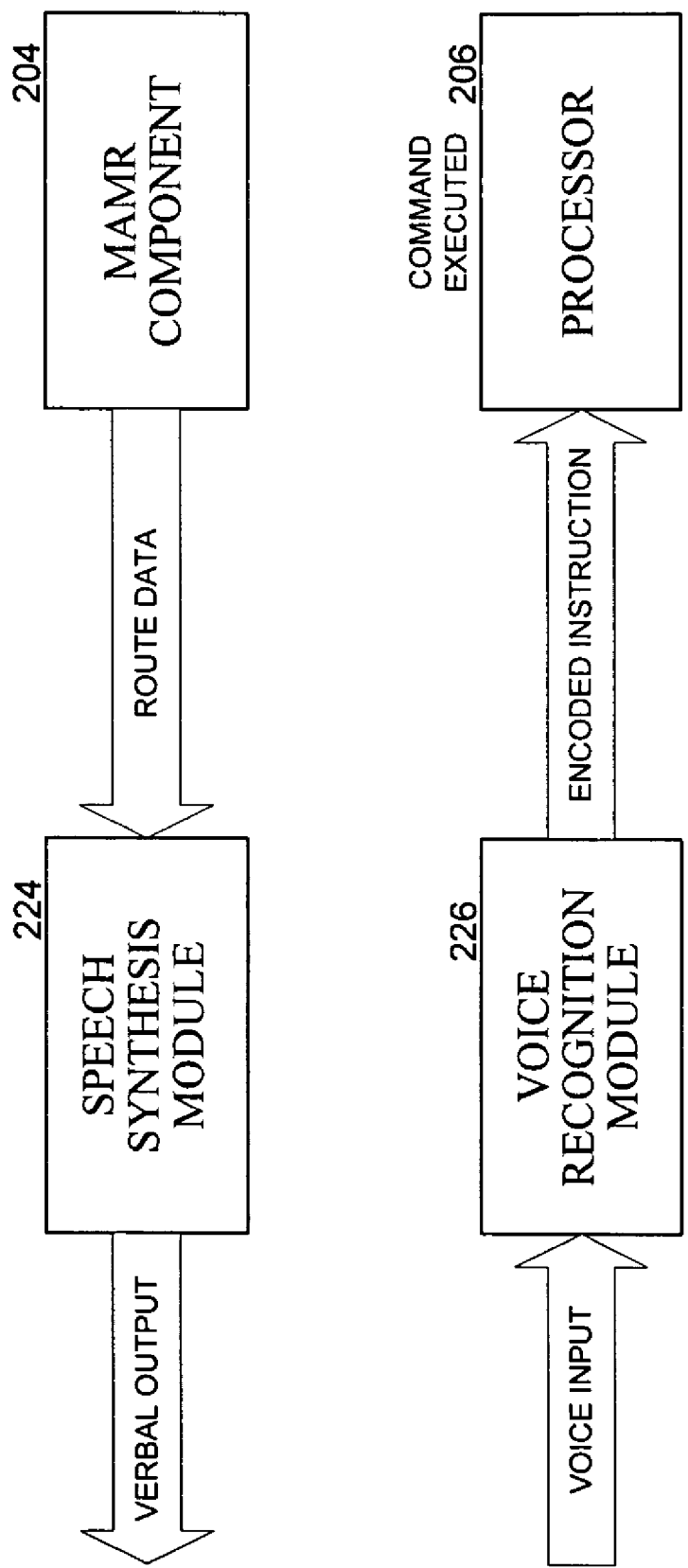
FIG. 3 is a data diagram showing an example of the flow of information through the mobile data collection system of FIGS. 1 and 2.

FIG. 3 provides an example of some of the ways that data may travel through components of the system. For example, route data may travel from the mobile automatic meter reading component 202 of the mobile data collection system 108 to the speech synthesizer 224, where it is converted into audible computer speech tones. Many different types of speech synthesis technology may be used for this process. For example, synthesis by rule technology (e.g., format engines) may be used to produce text-to-speech capabilities. If more memory is available, more natural sounding text-to-speech capabilities may be used, such as those based on stored human speech segments (e.g., the use of connected diphones in combination with various other synthesis techniques).

Likewise, voice input provided by the operator may travel to the voice recognition component 226, resulting in a computer readable medium that can be processed at the processor 206. Overall, many different types of speech synthesis and voice recognition technologies may be used.

III. Data Structures

FIGS. 4 and 5 provide examples of voice and speech information processed in the mobile data collection system, in the context of computer-readable media that provide nonvolatile storage of computer readable instructions, data structures, program modules and other data for the mobile data collection system. Such computer-readable media may include, but is not limited to magnetically or optically readable computer discs, hard-wired or preprogrammed chips (e.g., EEPROM semiconductor chips), nanotechnology memory, or other data storage medium. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or may be provided on any analog or digital network (packet switched, circuit switched or other scheme). Those skilled in the relevant art will recognize that portions of the invention reside on a server computer, while corresponding portions reside on a client computer such as a mobile or portable device, and thus, while certain hardware platforms are described herein, aspects of the invention are equally applicable to nodes on a network.

Any number of data structures and types can be employed herein. For example, relevant data can have preceding headers, or other overhead data preceding (or following) the relevant data. Alternatively, relevant data can avoid the use of any overhead data, such as headers, and simply be recognized by a certain byte or series of bytes within a serial data stream. Data structures may conform to conventions of object oriented programming and/or to other types of programming techniques.

Referring to FIG. 4, the mobile data collection system may recognize any one of a number of incoming voice commands. Examples of such incoming voice commands include commands to identify any missed meters in a current route (e.g., "ID a missed meter" 402), request a current location of the vehicle (e.g., "Where am I?" 404), request help using the mobile data collection system (e.g., "Help" 406), request to proceed to a next meter reading or meter servicing route (e.g., "Next route" 408), repeat a previous voice instruction received from the system (e.g., "Repeat last instruction" 410), load a new meter reading or meter servicing route from a head end system (e.g., "Load new route" 412), select a new route to load into the mobile data collection system (e.g., "Select route" 414), recite a list of menu items (e.g., "List menu items" 416), specify the last endpoint read in the route (e.g., "Last endpoint" 418), input a new location into the mobile data collection system (e.g., "Input new location" 420), input a route note (e.g., "Input note" 422), update incorrect or incomplete endpoint data (e.g., "Update meter data" 424), filter out endpoints of interest in a route (e.g., "Filter endpoints" 426), input information on route history (e.g., "Input route history" 428), input information for a manual meter read (e.g., "Input manual read" 430), log on to the system (e.g., "logon" 432), etc. These example commands are intended for illustrative purposes, and do not limit the scope of the invention. It is, of course possible to implement variations of these commands as well as other types of commands or combinations of commands.

Referring to FIG. 5 the mobile data collection system may output various types of audible information (e.g., text-to-speech). This information may include driving directions for routes 502 (e.g., "Turn right on Main Street in 200 feet"), route optimization instructions 504 (e.g., "Slow down: entering meter dense area"), general alerts 506 (e.g., "Beware of dog"), route discrepancies 508 (e.g., "An out of route endpoint has been identified"), service requests 510 (e.g., "Service has been requested at 1201 Third Avenue"), route status information 512 (e.g., "Route XYZ is now complete"), etc. These example speech outputs are simply intended for illustrative purposes and many others are possible. It is possible to implement variations of the above speech outputs as well as other types of speech outputs or audible outputs (e.g., beeps and tones).

IV. User Interface

Figure 6:
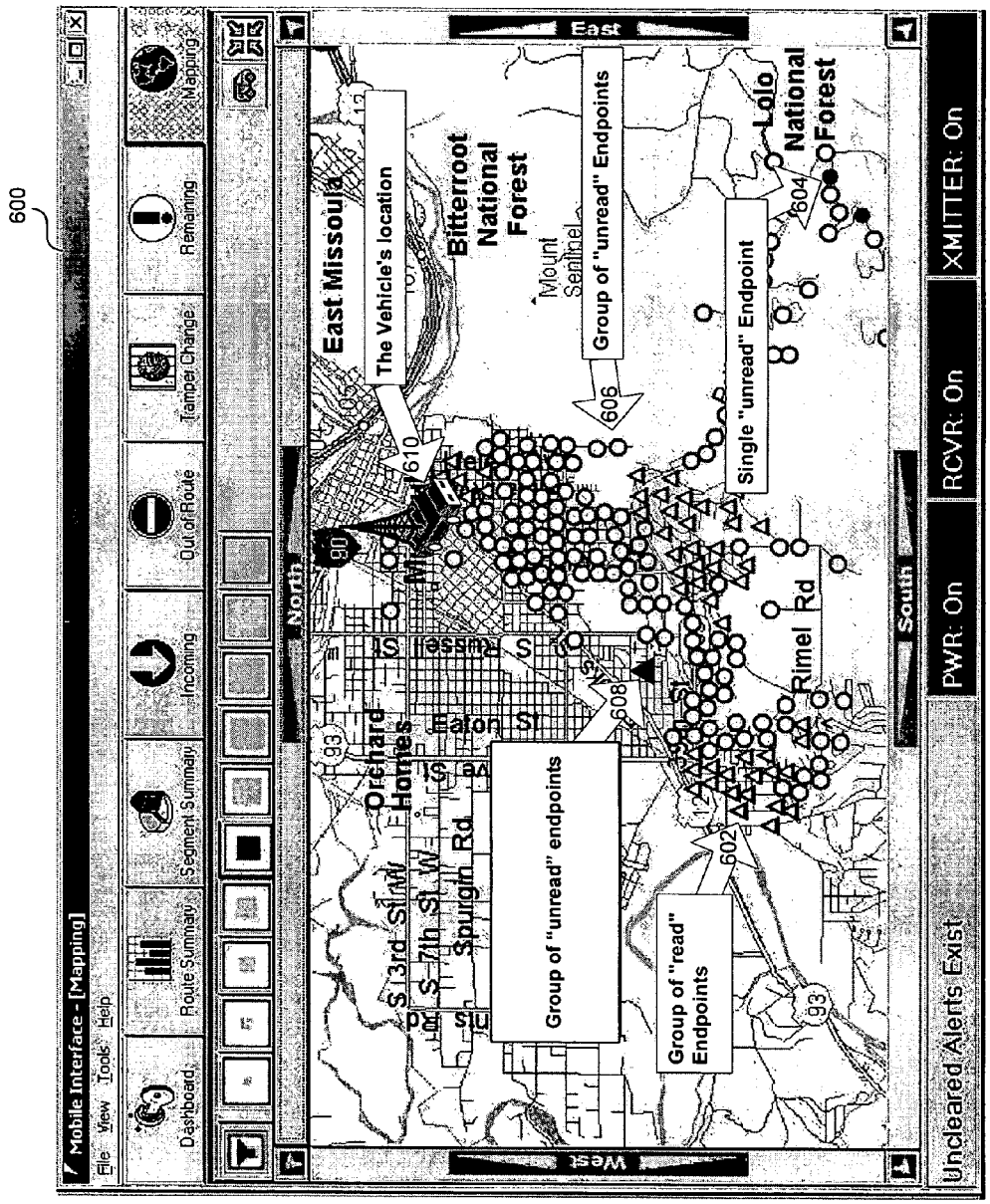
FIG. 6 is a display diagram showing a mapping screen used in conjunction with the voice recognition and speech synthesis functionality of the mobile data collection system of FIGS. 1 and 2.

The voice recognition and/or speech technology can be used in conjunction with a mapping interface, as illustrated in FIG. 6. For example, the operator can monitor route reading progress using a mapping view 600. The mapping view 600 allows the operator to see the vehicle's location and the changing status (e.g., unread, read, out of route, etc.) of route endpoints as travel over a route progresses. Many different types of endpoints may be shown, including single read endpoints 602, single unread endpoints 604, single groups of read endpoints 606, single groups of unread endpoints 608, and the vehicle 610. It may also be possible for the operator to choose special or custom map symbols associated with their specific criteria. In the illustrated embodiment, the map is dynamic, meaning that it changes as the meter reading route progresses. For example, unread endpoints may change to read endpoints as readings occur, and new endpoints may appear on the map as they come into range. In addition, the mapping may provide information about the order or timing of a communication with an endpoint. For example, the most recent endpoints (e.g., most recently read endpoints) may appear in a bright resolution or shade while the older endpoints (e.g., least recently read) may appear slightly faded, but both being of the same shape and color.

In some embodiments, the map is interactive by allowing operators to drill down on specific endpoints. For example, clicking on or touching an endpoint on the map may result in the display of specific information regarding the endpoint. In addition, the voice recognition capabilities may include a functionality that allows the operator to control the mapping interface.

V. System Flows

Figure 7:
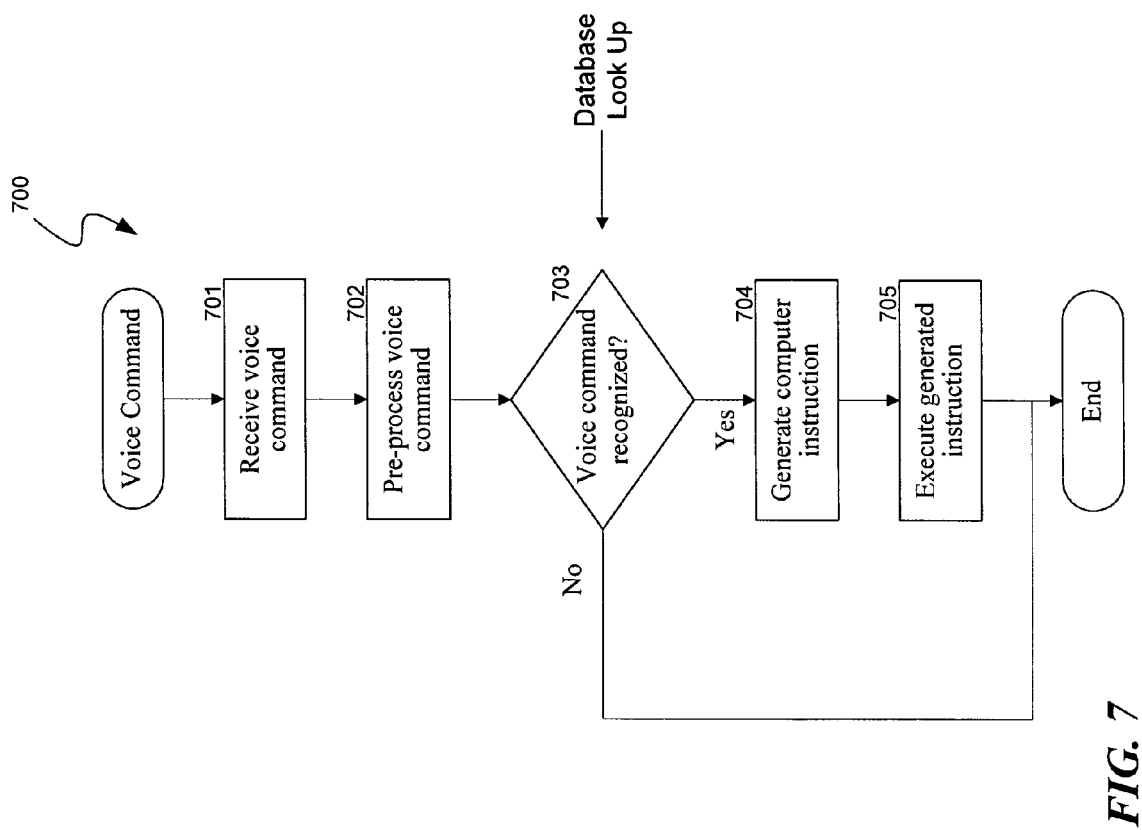
FIG. 7 is a flow diagram showing an example of a processing of a user's voice command in the mobile data collection system of FIGS. 1 and 2.
Figure 8:
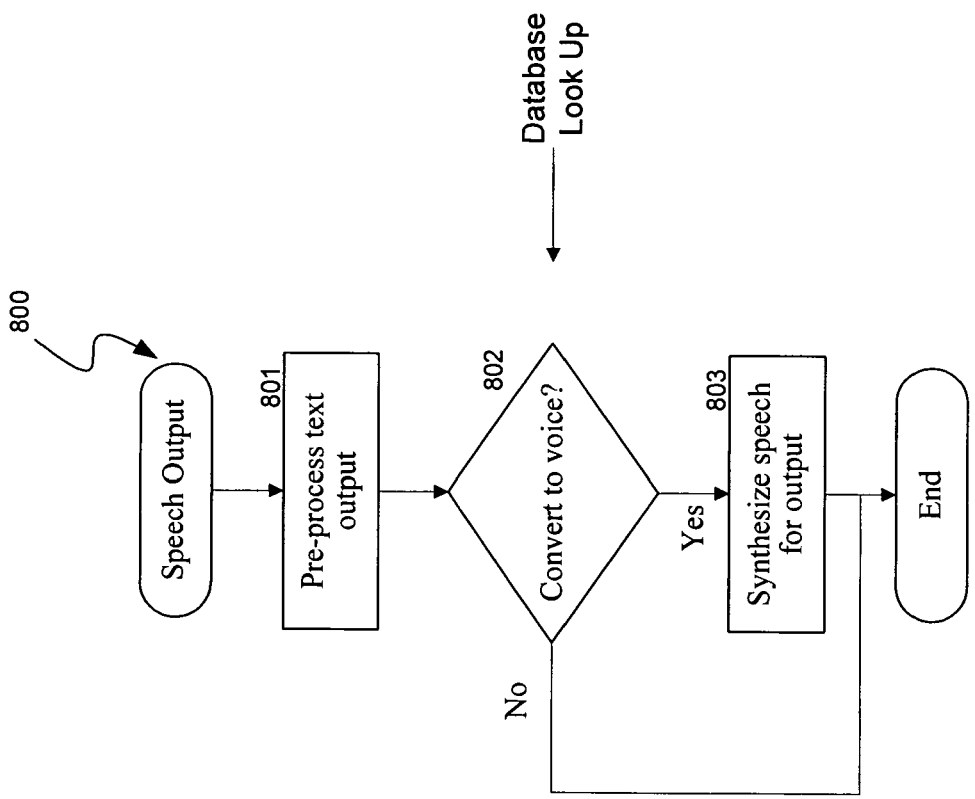
FIG. 8 is a flow diagram showing an example of a generation of a speech output in the mobile data collection system of FIGS. 1 and 2.

FIGS. 7 and 8 are representative flow diagrams that show processes and the flow of information that occur within the system of FIG. 1. These flow diagrams do not show all functions or exchanges of data but, instead, provide an understanding of commands and data exchanged under the system. Those skilled in the relevant art will recognize that some functions or exchanges of commands and data may be repeated, varied, omitted, or supplemented, and other aspects not shown may be readily implemented. For example, while not described in detail, a message containing data may be transmitted through a message queue, over HTTP, etc.

Referring to FIG. 7, a routine 700 for processing an incoming voice command at a mobile data collection system is shown. In some embodiments, the routine 700 is performed at the mobile data collection system itself. In other embodiments, the routine 700 is performed, at least in part, outside the mobile data collection system (e.g., at a speech server).

At block 701, the routine 700 receives an incoming voice command from an operator of the mobile data collection system. For example the operator may be requesting data (e.g., request directions), or entering data into the system (e.g., providing manual meter reading data into the system). At block 702, the routine 700 pre-processes the voice command using, for example a voice engine or other voice recognition technology. For example, the routine 700 may convert the speech command to text or another code recognized by the mobile data collection system. At decision block 703, the routine 700 checks whether the pre-preprocessed voice command is recognized by the mobile data collection system. If at decision block 703, the routine 700 does not recognize the pre-processed voice command, the routine ends. If, however, at decision block 703, the routine 700 recognizes the pre-processed voice command, the routine 700 continues at block 703, where it generates computer instructions based on the pre-processed voice command. The routine 700 then continues at block 704, where the generated computer instruction is executed. The routine 700 then ends.

Referring to FIG. 8, a routine 800 for producing speech output at a mobile data collection system is shown. For example, this speech output may be used to direct an operator to turn on a street, or provide requested route information. Other examples of speech output are described with respect to FIG. 5. In this particular example, the speech output is generated from text output produced by the system. However, the speech output may be generated from formats other than text.

At block 801, the routine 800 pre-processes the text output produced by the system. At block 802, the routine 800 checks whether the pre-processed text output should be converted to speech, or otherwise presented (e.g., displayed). For example, this may involve a database lookup to determine whether the text output is set to be presented as voice output. If at decision block 802, the routine 800 should not be converted to speech, the routine 800 ends. Otherwise, the routine 800 continues at block 803, where the routine 800 synthesizes the speech for output. For example, this may include a speech synthesizer creating an expanded phonetic representation of standard text and then identifying appropriate speech units. The speech synthesizer may then concatenate the identified speech units and transfer them into a digital representation of a speech signal, which may ultimately be changed into an analog speech signal for playing through a speaker.

VI. Conclusion

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Additionally, the words "herein," "above," "below," and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list.

The above Detailed Description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times. Where the context permits, words in the above Detailed Description using the singular or plural number may also include the plural or singular number, respectively.

The teachings of the invention provided herein can be applied to other systems, not necessarily the system described herein. The elements and acts of the various embodiments described above can be combined to provide further embodiments.

This application is related to commonly owned U.S. application Ser. No. 10/903,886, filed Jul. 30, 2004, entitled "Mapping in Mobile Data Collection Systems, Such as for Utility Meter Reading and Related Applications," which is incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description details certain embodiments of the invention and describes the best mode contemplated, no matter how detailed the above appears in text, the invention can be practiced in many ways. Details of the mobile data collection system may vary considerably in their implementation details, while still be encompassed by the invention disclosed herein. As noted above, particular terminology used when describing certain features or aspects of the invention should not be taken to imply that the terminology is being re-defined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

I claim:

1. A mobile utility data collection system for automatically or semi-automatically collecting data regarding consumption of a public utility, the system comprising:
    a remote reading component configured to facilitate communications from one or more endpoints, including receiving meter information from the one or more endpoints that relates to consumption of a gas, water, and/or electric utility;
    an automatic meter reading component configured to collect and manage information received by the remote meter reading component;
    a speech synthesis component coupled to the automatic meter reading component and configured to provide audio output to an operator of the mobile data collection system, wherein the audio output includes audible signals corresponding to prerecorded human speech or artificial human speech, and wherein the prerecorded human speech or artificial human speech includes statements for informing an operator about collection of utility data or about a current state of the mobile utility data collection system; and
    a voice recognition component coupled to the automatic meter reading component and configured to process incoming human speech commands, wherein the voice recognition component is configured for use in generating computer-readable instructions for controlling at least some operations of the mobile utility data collection system.

2. The system of claim 1 wherein the remote meter reading component, the automatic meter reading component, the speech synthesis component, and the voice recognition component operate within a vehicle during performance of a meter reading route.

3. The system of claim 1 wherein the automatic meter reading component performs tasks from the group comprising:
    maintaining route-related meter reading statistics;
    providing operating status information for the mobile data collection system;
    storing collected meter-reading data;
    processing collected meter reading data;
    formatting collected meter reading data; and
    displaying collected meter reading data.

4. The system of claim 1 wherein the automatic meter reading component performs administrative functions allowing users to control preferences and settings of the mobile data collection system.

5. The system of claim 1 wherein the remote reading component communicates with the endpoints, at least in part, via wake-up RF communications.

6. The system of claim 1 wherein the automatic meter reading component is further configured for performing activities associate with meter servicing.

7. A method for providing information in a mobile utility data collection system for automatically or semi-automatically collecting data regarding consumption of a water, gas, or electric utility, the method comprising:
    synthesizing information to be provided as output to an operator of the mobile utility data collection system, wherein the mobile utility data collection system is configured to collect information provided by multiple endpoints located in a vicinity associated with a utility meter reading route; and
    outputting audible signals at the mobile utility data collection system, wherein the audible signals correspond to prerecorded human speech or artificial human speech, and wherein at least some of the audible signals comprise statements for informing the operator about collection of utility data or about a current state of the mobile utility data collection system.

8. The method of claim 7 wherein the synthesizing includes performing text-to-speech processing.

9. The method of claim 7 wherein the audible signals include signals used to direct navigation during performance of a meter reading or meter servicing route.

10. The method of claim 7 wherein the audible signals include signals used to reflect status of operations handled by the mobile utility data collection system during performance of a meter reading or meter servicing route.

11. The method of claim 7 wherein the audible signals include signals used to alert the operator of a condition occurring during performance of a meter reading or meter servicing route, wherein the condition is from a group comprising:
    general meter reading route alerts;
    route discrepancy alerts;
    service alerts;
    missed endpoint alerts;
    out of route endpoint alerts;
    tamper alerts; and
    route status alerts.

12. The method of claim 7 wherein the audible signals include signals used to indicate that a meter reading or meter servicing route has been completed.

13. The method of claim 7 wherein the audible signals include signals used to direct navigation during performance of a meter reading or meter servicing route, wherein the audible signals include indications of when a driver should slow down a vehicle used to perform the meter reading route so as to conduct endpoint reads effectively.

14. The method of claim 7 wherein the audible signals are provided in conjunction with displaying mapping images used to show current progress of a vehicle while performing the meter reading route.

15. A mobile utility data collection system for receiving information in association with automatic or semi-automatic collection of utility data associated with consumption of a public utility, the system comprising:
    means for receiving voice commands at the mobile utility data collection system, wherein the voice commands relate to operation of the mobile utility data collection system, and wherein at least some of the received voice commands direct collection of utility consumption information provided by multiple endpoints located in a vicinity associated with a meter reading route; and means for processing the received voice command to generate an executable computer instruction for operating the mobile utility data collection system.

16. The mobile utility data collection system of claim 15 wherein the received voice command replaces one or more keyboard or mouse commands associated with a user interface.

17. The mobile utility data collection system of claim 15 wherein the executable computer instruction facilitates a user menu selection.

18. The mobile utility data collection system of claim 15 wherein the executable computer instruction facilitates selecting a next meter reading or meter servicing route to be performed via the mobile system.

19. The mobile utility data collection system of claim 15 wherein the executable computer instruction facilitates inputting manual meter read information.

20. The mobile utility data collection system of claim 15 wherein the executable computer instruction facilitates providing automated help services to an operator of the mobile system.

21. The mobile utility data collection system of claim 15 wherein the means for receiving and the means for processing are incorporated into a notebook computer or portable device.

22. A computer-readable medium for use in a mobile utility data collection system configured for automatic or semi-automatic meter reading, the computer-readable medium comprising:

at least one data structure used in association with collecting data from multiple endpoints, wherein the data collected from the multiple endpoints includes data related to consumption of a gas, water, or electric utility;

at least one data structure used in generating computer-readable instructions based on one or more user voice commands provided during operation of the mobile utility data collection system, wherein the one or more user voice commands are provided in association with controlling the operation of the mobile utility data collection system, and wherein at least some of the one or more user voice commands direct collection of utility consumption information provided by multiple endpoints located in a vicinity associated with a meter reading route.

23. The computer-readable medium of claim 22 wherein the one or more user voice commands relate to identifying missed meters during a meter reading route being performed by the mobile utility data collection system.

24. The computer-readable medium of claim 22 wherein the one or more user voice commands relate to identifying a current location of a vehicle from which the mobile utility data collection system is operating while performing a meter reading route.

25. The computer-readable medium of claim 22 wherein at least some of the one or more user voice commands relate to starting a new meter reading route to be performed by the mobile utility data collection system.

26. The computer-readable medium of claim 22 wherein at least some of the one or more user voice commands relate to selecting menu options offered by the mobile utility data collection system while performing a meter reading route.

27. The computer-readable medium of claim 22 wherein at least some of the one or more user voice commands relate to inputting an operator note while in the process of performing a meter reading route.

* * * * *